United States Patent
Lansberry et al.

(10) Patent No.: US 9,840,431 B2
(45) Date of Patent: Dec. 12, 2017

(54) METHODS AND APPARATUSES FOR SUPPORTING FORMING BODIES OF GLASS FORMING APPARATUSES

(71) Applicant: Corning Incorporated, Corning, NY (US)

(72) Inventors: Timothy L Lansberry, Watkins Glen, NY (US); Steven Michael Milillo, State College, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/992,532

(22) Filed: Jan. 11, 2016

(65) Prior Publication Data

US 2017/0197863 A1    Jul. 13, 2017

(51) Int. Cl.
   *C03B 17/06*    (2006.01)

(52) U.S. Cl.
   CPC .................................. *C03B 17/064* (2013.01)

(58) Field of Classification Search
   CPC ..................................................... C03B 17/064
   See application file for complete search history.

(56) References Cited

U.S. PATENT DOCUMENTS

| | | |
|---|---|---|
| 3,519,411 A | 7/1970 | Cortright et al. |
| 2003/0192349 A1 | 10/2003 | Meda et al. |
| 2005/0138966 A1 | 6/2005 | Pitbladdo |
| 2006/0236722 A1 | 10/2006 | Delia et al. |
| 2008/0276649 A1 | 11/2008 | Park |
| 2011/0253226 A1 | 10/2011 | Park |
| 2012/0266632 A1 | 10/2012 | Pitbladdo |
| 2012/0272688 A1* | 11/2012 | Kano ....................... C03B 18/06 65/195 |
| 2013/0269390 A1 | 10/2013 | Pitbladdo |
| 2013/0319049 A1* | 12/2013 | Grzesik ................. C03B 17/064 65/53 |
| 2014/0318523 A1 | 10/2014 | Schermerhorn |
| 2015/0218028 A1* | 8/2015 | Tamamura ............ C03B 17/064 65/53 |

FOREIGN PATENT DOCUMENTS

| | | |
|---|---|---|
| JP | 2006248855 A | 9/2006 |
| JP | 3837729 B2 | 10/2006 |
| KR | 2011058832 A | 6/2011 |
| WO | 2011150189 A2 | 12/2011 |

OTHER PUBLICATIONS

International Search Report and Written Opinion PCT/US2017012439 dated Mar. 24, 2017.

* cited by examiner

*Primary Examiner* — Cynthia Szewczyk
(74) *Attorney, Agent, or Firm* — Matthew B. McNutt (57) ABSTRACT

A glass forming apparatus may include a forming body comprising a first forming surface and a second forming surface converging at a root. The apparatus may also include at least one cradle assembly comprising a first contact surface and a second contact surface oriented in a V-configuration. The contact surfaces may be engaged with the forming surfaces. The contact surfaces may impart a holding force to the forming body, the holding force having an upward vertical force component. The forming body may also include at least one end block engaged with an end face of the forming body. The at least one end block may impart a compression force to the forming body in a direction parallel to a length of the forming body and perpendicular to the restraining force component.

20 Claims, 9 Drawing Sheets

METHODS AND APPARATUSES FOR SUPPORTING FORMING BODIES OF GLASS FORMING APPARATUSES

BACKGROUND

Field

The present specification generally relates to glass forming apparatuses and, more specifically, to methods and apparatuses for supporting forming bodies of glass forming apparatuses.

Technical Background

The fusion process is one technique for forming glass ribbons. Compared to other processes for forming glass ribbons, such as the float and slot-draw processes, the fusion process produces glass ribbons with a relatively low amount of defects and with surfaces having superior flatness. As a result, the fusion process is widely employed for the production of glass substrates that are used in the manufacture of LED and LCD displays and other substrates that require superior flatness and smoothness.

In the fusion process, molten glass is fed into a forming body (also referred to as an isopipe) which includes forming surfaces which converge at a root. The molten glass evenly flows over the forming surfaces of the forming body and forms a ribbon of flat glass with pristine surfaces that is drawn from the root of the forming body.

The forming body is generally made of refractory materials, such as refractory ceramics, which are better able to withstand the relatively high temperatures of the fusion process. However, the mechanical properties of even the most temperature-stable refractory ceramics may degrade over extended periods of time at elevated temperatures, potentially resulting in the degradation of characteristics of the glass ribbon produced therefrom or even failure of the forming body. Either case may result in disruption of the fusion process, lower product yields, and increased production costs.

Accordingly, a need exists for alternative methods and apparatuses for mitigating the degradation of forming bodies of glass forming apparatuses.

SUMMARY

According to one embodiment, a glass forming apparatus may include a forming body comprising a first forming surface and a second forming surface, the first forming surface and the second forming surface converging at a root. The glass forming apparatus may also include at least one cradle assembly comprising a first contact surface and a second contact surface oriented in a V-configuration with respect to one another. The first contact surface may be engaged with the first forming surface of the forming body and the second contact surface may be engaged with the second forming surface of the forming body. The first contact surface and the second contact surface may impart a holding force to the forming body, the holding force having an upward vertical force component. The forming body may also include at least one end block engaged with an end face of the forming body. The at least one end block may impart a compression force to the forming body in a direction parallel to a length of the forming body and perpendicular to the restraining force component.

In another embodiment, a method for supporting a forming body comprising a first forming surface and a second forming surface converging at a root may include applying a holding force to the first forming surface and the second forming surface, the holding force having an upward vertical force component thereby preventing movement of the forming body in a downward vertical direction. The method may also include applying a compression force to an end face of the forming body in a direction parallel to a length of the forming body, the compression force imparting a counter moment thereby mitigating sag along the length of the forming body.

Additional features and advantages of the glass forming apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
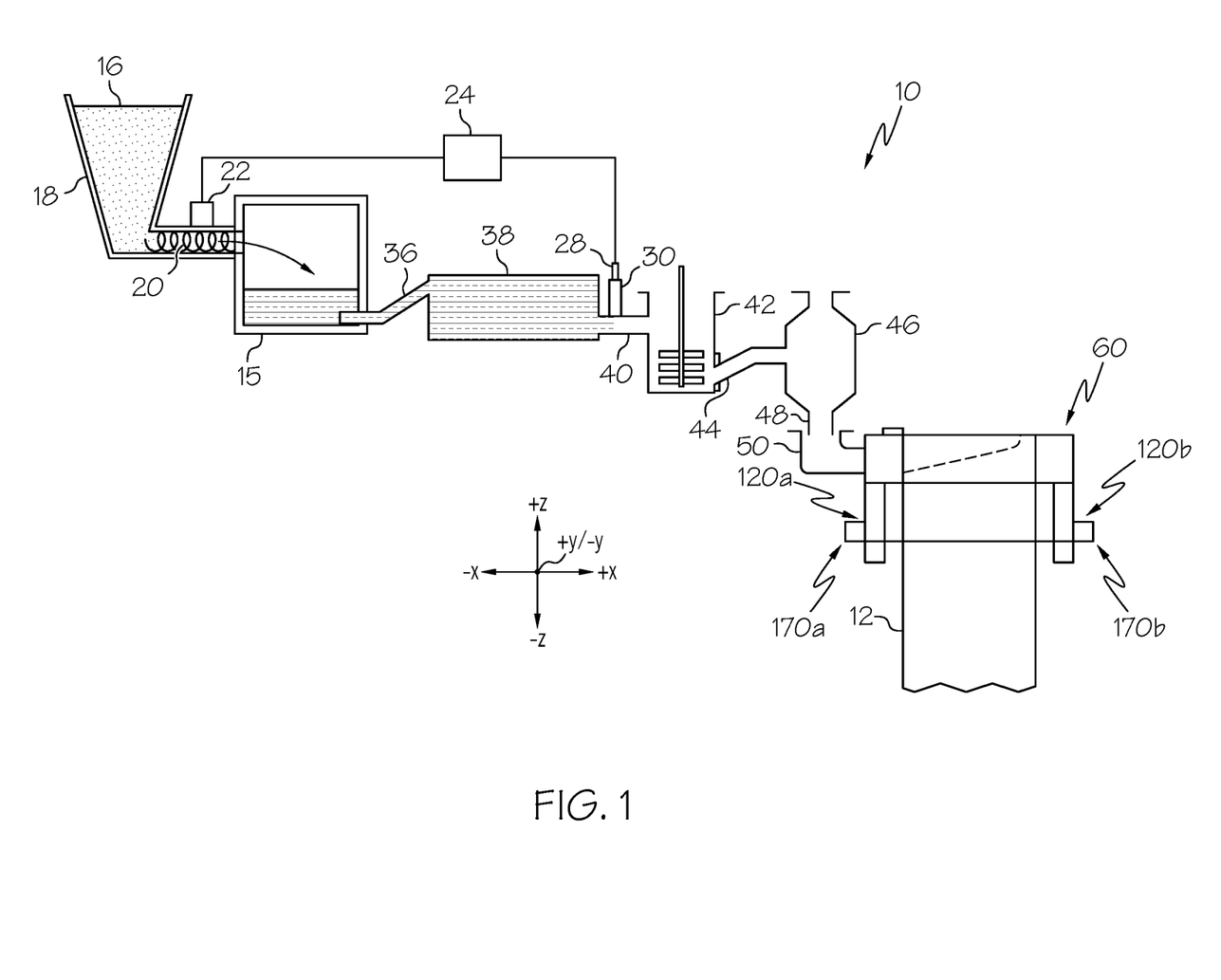
FIG. 1 schematically depicts one embodiment of a glass forming apparatus according to one or more embodiments shown and described herein.
Figure 2:
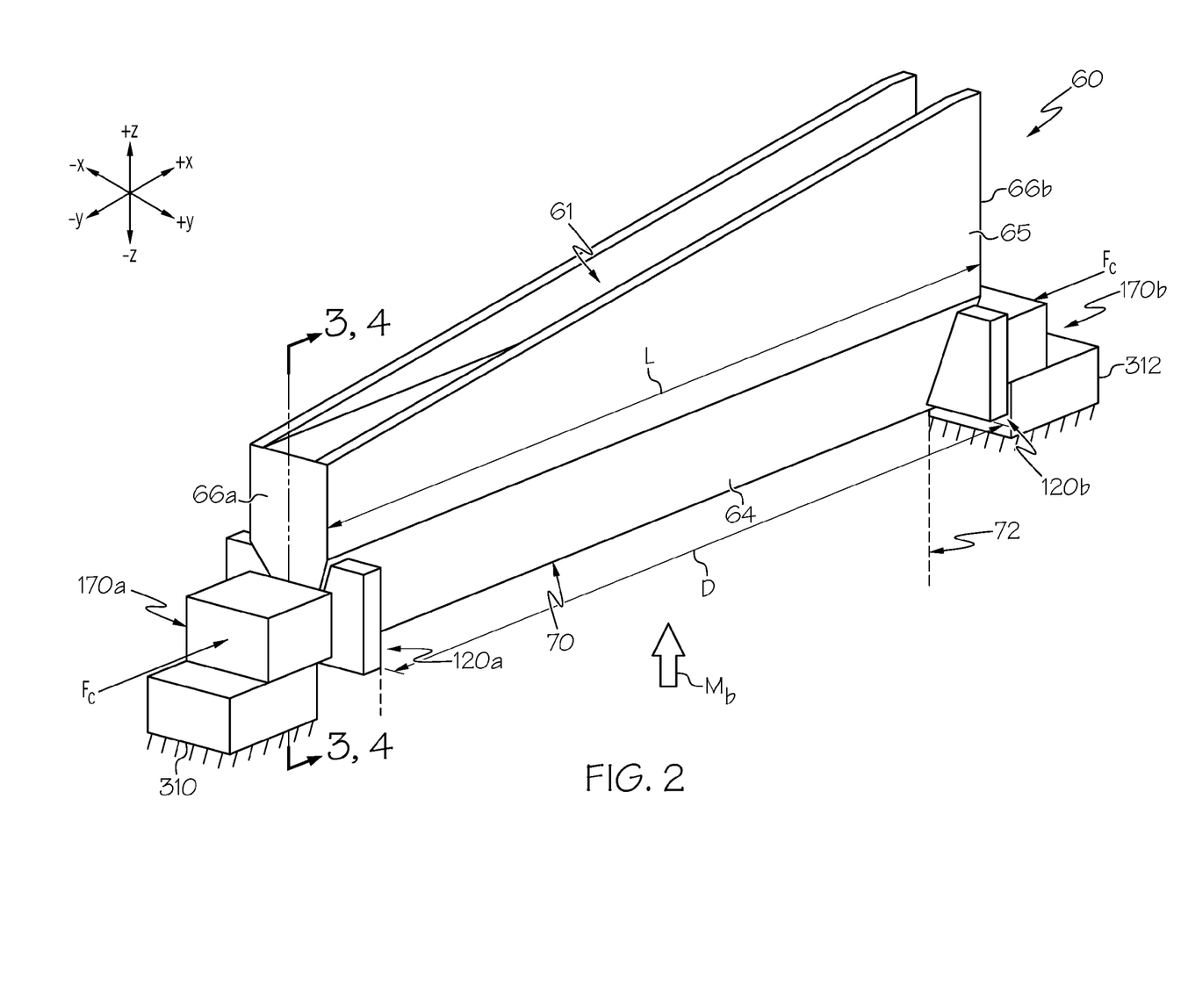
FIG. 2 schematically depicts a perspective view of a forming body supported by cradle assemblies according to one or more embodiments shown and described herein.

Reference will now be made in detail to embodiments of glass forming apparatuses, examples of which are illustrated in the accompanying drawings. Whenever possible, the same reference numerals will be used throughout the drawings to refer to the same or like parts. One embodiment of a glass forming apparatus 10 is schematically depicted in FIG. 1 (& 2?). The glass forming apparatus 10 may include a forming body 60 comprising a first forming surface 62 and a second forming surface 64, the first forming surface 62 and the second forming surface 64 converging at a root 70. The glass forming apparatus 10 may also include at least one cradle assembly 120 comprising a first contact surface 132 and a second contact 134 surface oriented in a V-configuration with respect to one another. The first contact surface 132 may be engaged with the first forming surface 62 of the forming body 60 and the second contact surface 134 may be engaged with the second forming surface 64 of the forming body 60. The first contact surface 132 and the second contact surface 134 may impart a holding force to the forming body 60, the holding force having an upward vertical force component. The forming body 60 may also include at least one end block 170*a* engaged with an end face of the forming body 60. The at least one end block 170*a* may impart a compression force to the forming body 60 in a direction parallel to a length of the forming body 60 and perpendicular to the restraining force component. Various embodiments of glass forming apparatuses 10 and methods for supporting forming bodies 60 of glass forming apparatuses 10 will be described in further detail herein with specific reference to the appended drawings.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a glass forming apparatus 10 for making glass articles, such as a glass ribbon 12, is schematically depicted. The glass forming apparatus 10 may generally include a melting vessel 15 configured to receive batch material 16 from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass forming apparatus 10 can also include a fining vessel 38, such as a fining tube, coupled to the melting vessel 15 by way of a first connecting tube 36. A mixing vessel 42 is coupled to the fining vessel 38 with a second connecting tube 40. A delivery vessel 46 is coupled to the mixing vessel 42 with a delivery conduit 44. As further illustrated, a downcomer 48 is positioned to deliver glass melt from the delivery vessel 46 to an inlet 50 of a forming body 60. In the embodiments shown and described herein, the forming body 60 is a fusion-forming vessel which may also be referred to as an isopipe.

The melting vessel 15 is typically made from a refractory material, such as refractory (e.g., ceramic) brick. The glass forming apparatus 10 may further include components that are typically made from electrically conductive refractory metals such as, for example, platinum or platinum-containing metals such as platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the delivery conduit 44, the delivery vessel 46, the downcomer 48 and the inlet 50.

Figure 3:
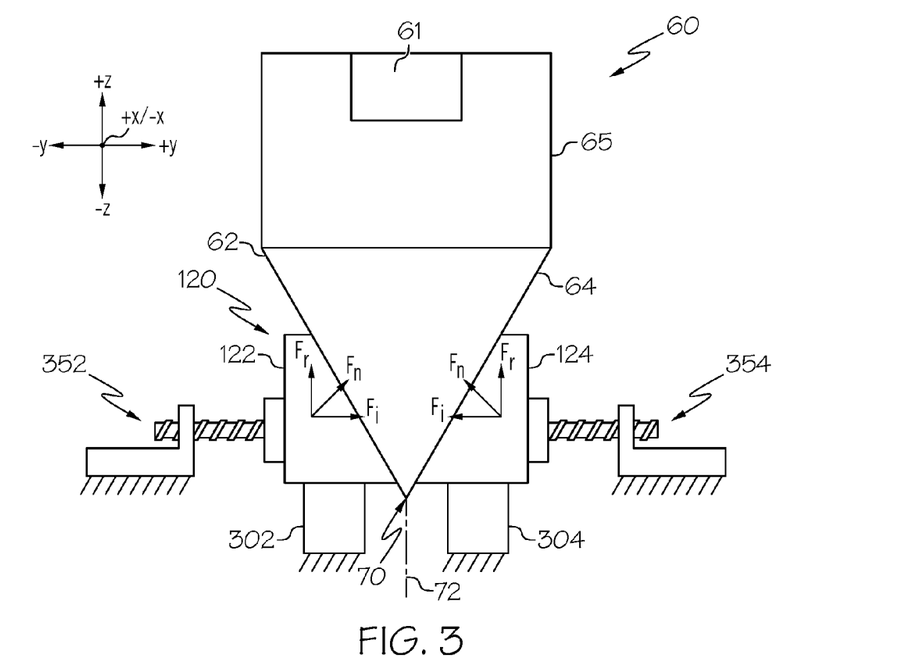
FIG. 3 schematically depicts a cross section of the forming body supported with a cradle assembly according to one or more embodiments described herein.

Referring now to FIGS. 2 and 3, the forming body 60 generally includes a trough 61, a first forming surface 62, and a second forming surface 64. The trough 61 is located in the upper portion 65 of the forming body 60. The first forming surface 62 and the second forming surface 64 extend from the upper portion 65 of the forming body 60 in a downstream direction (i.e., the −Z direction of the coordinate axes depicted in the figures) and converge towards one another, joining at a root 70. The root 70 forms the lower edge of the forming body 60. Accordingly, it should be understood that the first forming surface 62 and the second forming surface 64 form an inverted isosceles (or equilateral) triangle extending from the upper portion 65 of the forming body 60 with the root 70 forming the lower-most vertex of the triangle in the downstream direction. A draw plane 72 generally bisects the root 70 in the +/−Y directions of the coordinate axes depicted in the figures and extends in the downstream direction.

Referring now to FIGS. 1-3, in operation, batch material 16, specifically batch material for forming glass, is fed from the storage bin 18 into the melting vessel 15 with the batch delivery device 20. The batch material 16 is melted into molten glass in the melting vessel 15. The molten glass passes from the melting vessel 15 into the fining vessel 38 through the first connecting tube 36. Dissolved gasses, which may result in glass defects, are removed from the molten glass in the fining vessel 38. The molten glass then passes from the fining vessel 38 into the mixing vessel 42 through the second connecting tube 40. The mixing vessel 42 homogenizes the molten glass, such as by stirring, and the homogenized molten glass passes through the delivery conduit 44 to the delivery vessel 46. The delivery vessel 46 discharges the homogenized molten glass through downcomer 48 and into the inlet 50 which, in turn, passes the homogenized molten glass into the trough 61 of the forming body 60.

The homogenized molten glass fills the trough 61 of the forming body 60 and ultimately overflows, flowing over the upper portion 65 of the forming body 60 along its length L and in the downstream direction. The homogenized molten glass flows from the upper portion of the forming body 65 and onto the first forming surface 62 and the second forming surface 64. Streams of homogenized molten glass flowing over the first forming surface 62 and the second forming surface 64 join and fuse together (hence "fusion forming")

at the root 70, forming a glass ribbon 12 which is drawn on the draw plane 72 in the downstream direction by pulling rolls (not shown). The glass ribbon 12 may be further processed downstream of the forming body 60 such as by segmenting the glass ribbon 12 into discrete glass sheets, rolling the glass ribbon 12 upon itself, and/or applying one or more coatings to the glass ribbon 12.

The forming body 60 is typically formed from refractory ceramic materials which are chemically compatible with the molten glass and which are capable of withstanding the high temperatures associated with the fusion forming process. Typical materials from which the forming body is formed include, without limitation, zircon, silicon carbide, xenotime, and/or alumina based refractory ceramics. Given the combined mass of the forming body 60 and the molten glass, along with the elevated temperatures of the fusion forming process, the forming body 60 tends to sag in the downstream direction along its length L due to material creep. This sag can be most pronounced at the unsupported midpoint of the length L of the forming body 60.

The sag in the forming body 60 causes the homogenized molten glass flowing over the forming surfaces 62, 64 to redistribute, creating a non-uniform flow of molten glass over the forming surfaces 62, 64 which results in changes to the dimensional attributes of the resultant glass ribbon 12. For example, a thickness of the glass ribbon 12 may increase proximate the center of the glass ribbon due to sag. In addition, the redistribution of the molten glass flow towards the center of the forming surfaces 62, 64 along the length L due to sag causes a decrease in glass flow proximate the ends of the forming body 60 resulting in non-uniformity in the dimension of the glass ribbon 12 in the +/−X direction of the coordinate axes depicted in the figures.

It has been determined that techniques to mitigate sag introduce stress in the forming body 60 which, in combination with material creep, may reduce the service life of the forming body. The embodiments of the glass forming apparatus 10 and forming bodies 60 described herein mitigate stress and sag in the forming body 60 to thereby prolong the service life of the forming body and stabilize the dimensional characteristics of the glass ribbon 12.

Figure 4:
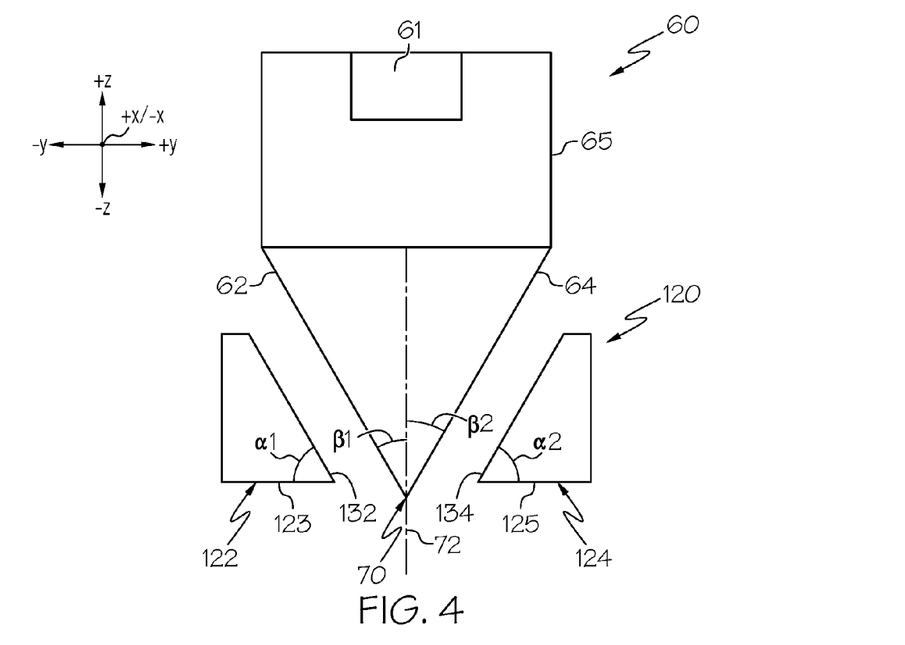
FIG. 4 schematically depicts a cross section of a forming body with the cradle blocks of a cradle assembly disengaged from the forming surfaces.

Referring now to FIGS. 1-4, the embodiments of the glass forming apparatus 10 described herein include at least one cradle assembly 120 engaged with the forming surfaces 62, 64 of the forming body 60 to mitigate sag in the forming body 60. First and second cradle assemblies 120a, 120b are depicted in FIGS. 1 and 2; a single cradle assembly 120 is depicted in FIGS. 3 and 4. In one embodiment, the cradle assembly 120 includes a pair of cradle blocks (i.e., a first cradle block 122 and a second cradle block 124 separate and independent of the first cradle block 122). FIG. 3 schematically depicts a cross section of the forming body 60 with the cradle assembly 120 engaged with the forming surfaces 62, 64 of the forming body. FIG. 4 schematically depicts the cradle assembly 120 with the cradle blocks 122, 124 disengaged from the forming surfaces 62, 64 of the forming body 60 for ease of description.

The first cradle block 122 of the cradle assembly 120 includes a first contact surface 132 which engages with the first forming surface 62 of the forming body 60. In embodiments, the first contact surface 132 of the first cradle block 122 is inclined at an angle α1 with respect to the base 123 of the first cradle block 122 such that the angle α1 is complementary with the angle β1 formed between the draw plane 72 and the first forming surface 62 of the forming body 60.

Similarly, the second cradle block 124 of the cradle assembly 120 includes a second contact surface 134 which engages with the second forming surface 64 of the forming body 60. In embodiments, the second contact surface 134 of the second cradle block 124 is inclined at an angle α2 with respect to the base 125 of the second cradle block 124 such that the angle α2 is complementary with the angle β2 formed between the draw plane 72 and the second forming surface 64 of the forming body 60. In this embodiment, the first contact surface 132 and the second contact surface 134 of the cradle assembly 120 are oriented in a V-configuration with respect to one another.

The cradle blocks 122, 124 of the cradle assembly 120 are positioned relative to the forming body 60 such that the root 70 of the forming body 60 extends through and is positioned below the cradle assembly 120 in the downstream direction. However, it should be understood that alternative arrangements are contemplated and possible. For example, in an alternative embodiment (not depicted), the cradle blocks 122, 124 of the cradle assembly 120 are positioned relative to the forming body 60 such that the root 70 is in the same plane as the respective bases 123, 125 of the cradle blocks 122, 124. In another alternative embodiment (not depicted), the root 70 may be positioned upstream of the respective bases 123, 125 of the cradle blocks 122, 124 of the cradle assembly 120.

The cradle blocks 122, 124 of the cradle assembly 120 may be slidably positioned on respective structural members 302, 304 which are, in turn, statically affixed to ground such that the cradle blocks 122, 124 are supported in the +Z direction of the coordinate axes depicted in the figures.

In the embodiment of the cradle assembly 120 depicted in FIGS. 3 and 4, the cradle blocks 122, 124 are biased into contact with the respective forming surfaces 62, 64 of the forming body 60 such that the contact surfaces 132, 134 of the cradle blocks 122, 124 impart a holding force $F_h$ on the respective forming surfaces 62, 64 of the forming body 60. The terms "bias" and "biased," as used herein, means that the cradle blocks 122, 124 are pressed against the respective forming surfaces 62, 64 of the forming body 60. The holding force $F_h$ impinges the forming body 60 between the first cradle block 122 and the second cradle block 124. Further, due to the angled contact surfaces 132, 134 of the cradle blocks 122, 124, the holding force $F_h$ imparted against the forming surfaces 62, 64 of the forming body 60 by respective cradle blocks 122, 124 includes a restraining force component $F_r$ in the +Z direction of the coordinate axes shown in the figures (i.e., in the upstream or upward vertical direction). The restraining force component $F_r$ restricts movement of the forming body in the downstream direction, thereby maintaining the position of the forming body with respect to the −Z direction of the coordinate axes depicted in the figures.

Still referring to FIGS. 1-4, the holding force $F_h$ imparted against the forming surfaces 62, 64 of the forming body 60 by respective cradle blocks 122, 124 may also include an impinging force component $F_i$ in the +Y direction (from cradle block 122) and in the −Y direction (from cradle block 124) of the coordinate axes shown in the figures. The impinging force component restricts movement of the forming body 60 in the lateral direction (i.e., the +/−Y directions).

In embodiments, the impinging force component $F_i$ may be manipulated to adjust an elevation of the forming body 60 in either the upstream direction or the downstream direction by adjusting a magnitude of the impinging force component $F_i$. The impinging force component $F_i$ may be adjusted by advancing the first cradle block 122 and/or the second cradle block 124 towards the other which, in turn, increases or decreases the impinging force component $F_i$. For example, when one of the first cradle block 122 and the second cradle block 124 is advanced towards the other, the impinging force component $F_i$ increases. Due to the angle of the first and second contact faces 132, 134 of the cradle blocks 122, 124 and the angle of forming surfaces 62, 64 of the forming body 60, increasing the impinging force component $F_i$ causes the forming body 60 to slide in the upstream direction relative to the cradle blocks 122, 124, thereby increasing an elevation of the forming body.

The impinging force component $F_i$ may be decreased by moving the first cradle block 122 and/or the second cradle block 124 away from the other which, in turn, decreases the impinging force component $F_i$. For example, when one of the first cradle block 122 and the second cradle block 124 is moved away from the other, the impinging force component $F_i$ decreases. Due to the angle of the first and second contact faces 132, 134 of the cradle blocks 122, 124 and the angle of forming surfaces 62, 64 of the forming body 60, decreasing the impinging force component $F_i$ causes the forming body 60 to slide in the downstream direction relative to the cradle blocks 122, 124, thereby decreasing an elevation of the forming body.

In the embodiments described herein, the first cradle block 122 and the second cradle block 124 may be biased towards or away from one another with rams 352, 354, as depicted in FIG. 3. For example, the cradle assembly 120 may further include a first ram 352 engaged with the first cradle block 122 and a second ram 354 engaged with the second cradle block 124. The rams 352, 354 may be mechanical rams or, alternatively, hydraulic rams. The rams 352, 354 may be coupled to the respective cradle blocks 122, 124 such that actuation of the rams advances the cradle blocks 122, 124 either toward or away from one another.

While FIG. 3 depicts a first ram 352 and a second ram 354 engaged with respective cradle blocks 122, 124, it should be understood that other configurations are contemplated and possible. For example, in an alternative embodiment (not shown), the cradle assembly 120 includes a single ram (e.g., the first ram 352 engaged with the first cradle block 122), and the second cradle block 124 is fixed in position in the +/−Y direction of the coordinate axes depicted in the figures. In this embodiment, adjustment of the relative position of the first cradle block 122 with the first ram 352 adjusts the holding force $F_h$ (including the restraining force component $F_r$ and the impinging force component $F_i$) and the elevation of the forming body 60.

Figure 5:
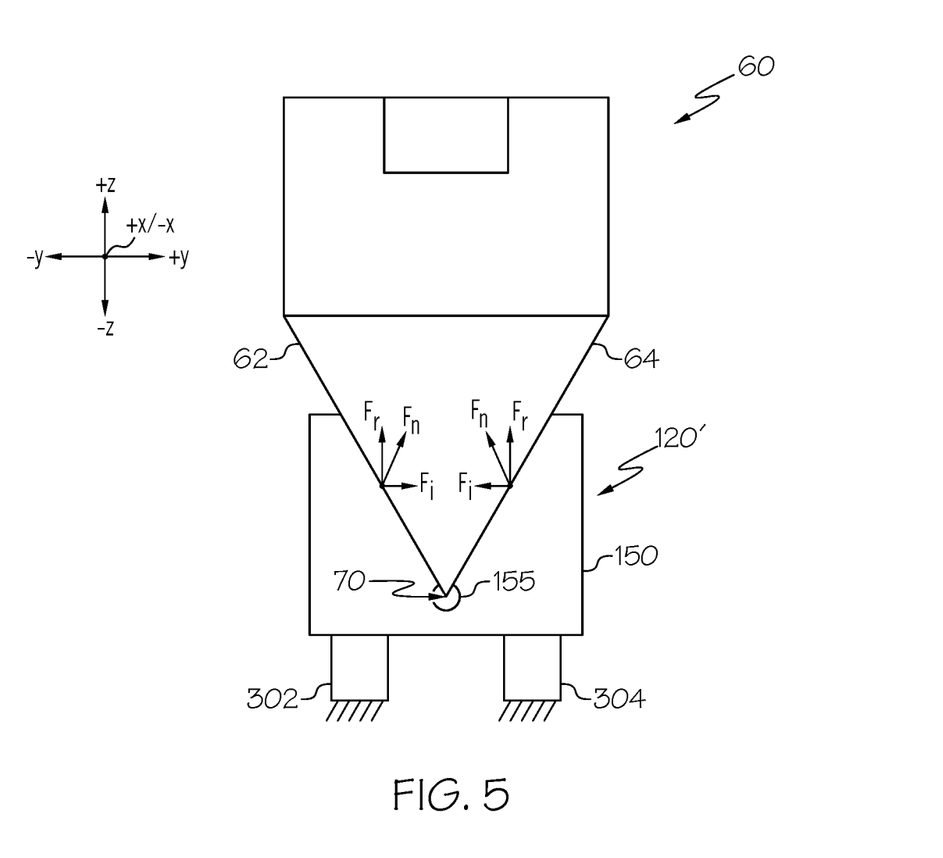
FIG. 5 schematically depicts a cross section of the forming body supported with a cradle assembly according to one or more embodiments described herein.
Figure 6:
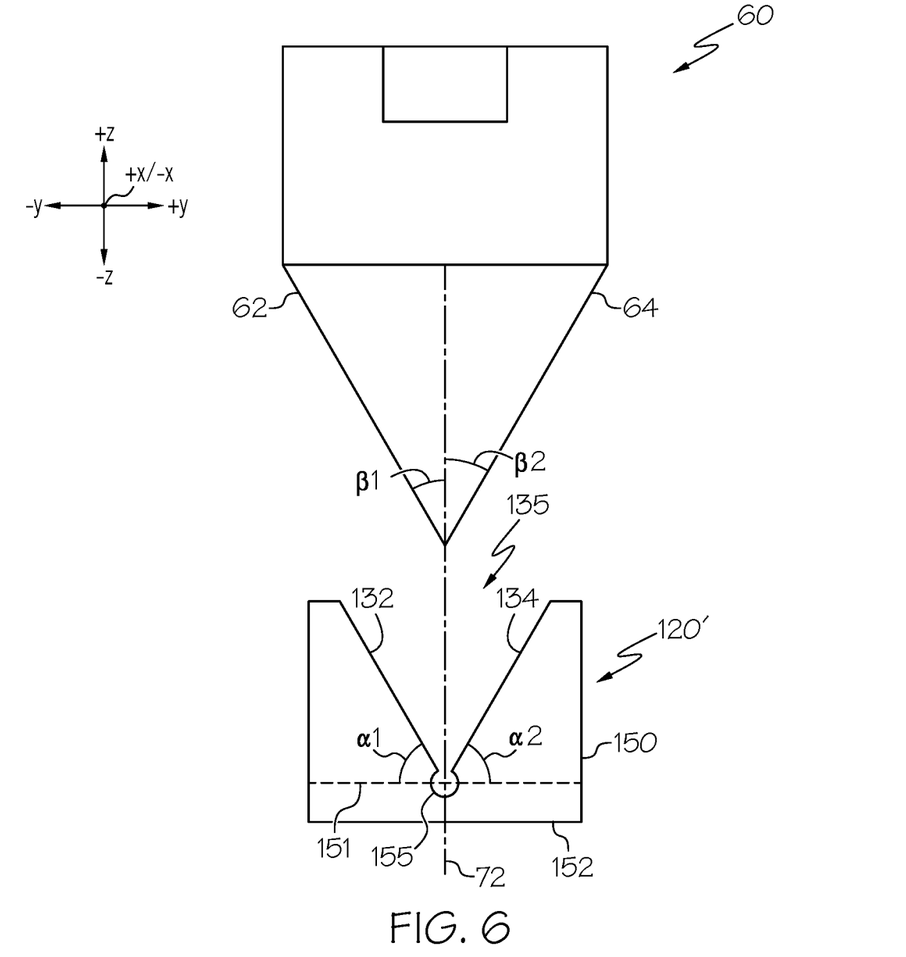
FIG. 6 schematically depicts a cross section of a forming body with the cradle block of a cradle assembly disengaged from the forming surfaces.

Referring now to FIGS. 5 and 6, an alternative embodiment of a cradle assembly 120' is schematically depicted. In this embodiment, the cradle assembly 120' comprises a single cradle block 150. FIG. 5 schematically depicts a cross section of the forming body 60 with the cradle assembly 120' engaged with the forming surfaces 62, 64 of the forming body 60. FIG. 6 schematically depicts the cradle assembly 120' with the cradle block 150 of the cradle assembly 120' disengaged from the forming body 60 for ease of description.

In the embodiment depicted in FIGS. 5 and 6, the cradle block 150 of the cradle assembly 120' includes a first contact surface 132 which engages with the first forming surface 62 of the forming body 60 and a second contact surface 134 which engages with the second forming surface 64 of the forming body 60. The first contact surface 132 and the second contact surface 134 are oriented in a V-configuration with respect to one another. In this embodiment, the first contact surface 132 and the second contact surface 134 are opposite sides of a V-shaped notch 135 formed in the cradle block 150.

In embodiments, the first contact surface 132 of the cradle block 150 is inclined at an angle $\alpha 1$ with respect to a plane 151 parallel to the base 152 of the cradle block 150 such that the angle $\alpha 1$ is complementary with the angle $\beta 1$ formed between the draw plane 72 and the first forming surface 62 of the forming body 60. Similarly, the second contact surface 134 of the cradle block 150 is inclined at an angle $\alpha 2$ with respect to a plane 151 parallel to the base 152 of the cradle block 150 such that the angle $\alpha 1$ is complementary with the angle $\beta 1$ formed between the draw plane 72 and the first forming surface 62 of the forming body 60.

When the forming body 60 is engaged with the cradle block 150 of the cradle assembly 120', the forming body 60 is positioned in the V-shaped notch 135 such that the root 70 of the forming body 60 is seated in a relief notch 155 formed at the vertex of the V-shaped notch 135 and the forming surfaces 62, 64 of the forming body 60 are engaged with respective contact surfaces 132, 134 of the cradle block 150 of the cradle assembly 120'. Accordingly, in this embodiment, the root 70 of the forming body 60 does not extend through the cradle assembly 120' but is, instead, in a fixed position above the base 152 of the cradle block 150.

The cradle block 150 of the cradle assembly 120' is positioned on structural members 302, 304 statically affixed to ground such that the cradle block 150 is supported in the +Z direction of the coordinate axes depicted in the figures. As a result, the cradle block 150, specifically the contact surfaces 132, 134, impart a holding force $F_h$ on the respective forming surfaces 62, 64 of the forming body 60. Due to the angled contact surfaces 132, 134 of the cradle block 150, the holding force $F_h$ imparted against the forming surfaces 62, 64 of the forming body 60 includes a restraining force component $F_r$ in the upstream or upward vertical direction. The restraining force component $F_r$ restricts movement of the forming body in the downstream direction, thereby maintaining the position of the forming body with respect to the +/−Z direction of the coordinate axes depicted in the figures. The holding force $F_h$ imparted against the forming surfaces 62, 64 of the forming body 60 may also include an impinging force component $F_i$ in the +Y direction (from the contact surface 132) and in the −Y direction (from the contact surface 134) of the coordinate axes shown in the figures. The impinging force component restricts movement of the forming body 60 in the lateral direction (i.e., the +/−Y directions).

In the embodiments of the cradle assemblies 120, 120' depicted in FIGS. 3-6, the cradle blocks 122, 124, and 150 may be formed from refractory ceramic materials suitable for withstanding the relatively high temperatures of the fusion forming process. Suitable materials include, without limitation, zircon, alumina, silicon carbide, and/or xenotime. In some embodiments, the cradle blocks 122, 124, 150 may be formed from the same material as the forming body 60 to ensure compatibility with the molten glass flowing over the forming body. In other embodiments, the cradle blocks 122, 124, 150 may be formed from a different material than the forming body 60.

Referring again to FIGS. 1 and 2, in the embodiment of the glass forming apparatus 10 depicted in FIG. 1 and the embodiment of the forming body 60 depicted in FIG. 2, the forming body 60 includes a pair of cradles assemblies 120a, 120b similar to the cradle assembly 120 shown and described with respect to FIGS. 3 and 4. In this embodiment, a first cradle assembly 120a is engaged with the forming body 60 at a first end of the forming body 60 and a second cradle assembly 120b is engaged with the forming body 60 at a second end of the forming body opposite the first end of the forming body, as depicted in FIGS. 1 and 2.

While FIGS. 1 and 2 schematically depict a glass forming apparatus 10 (FIG. 1) and a forming body 60 (FIG. 2) with cradle assemblies 120a, 120b similar to the cradle assembly 120 depicted in FIGS. 3 and 4, it should be understood that, alternatively, the cradle assemblies 120a, 120b may be constructed the same as the cradle assembly 120' depicted in FIGS. 5 and 6.

Referring now to FIG. 2, in the embodiments described herein, the glass forming apparatus 10 further includes at least one end block (end blocks 170a, 170b depicted in FIG. 2) engaged with the end faces 66a, 66b of the forming body 60. The end blocks 170a, 170b may be slidably positioned on respective structural members 310, 312 statically affixed to ground such that the end blocks 170a, 170b are supported in the +Z direction of the coordinate axes depicted in the figures.

In embodiments, the end blocks 170a, 170b may be formed from refractory ceramic materials suitable for withstanding the relatively high temperatures of the fusion forming process. Suitable materials include, without limitation, zircon, alumina, silicon carbide, and/or xenotime. Alternatively, the end blocks may be formed from alloys suitable for use at elevated temperatures, such as cobalt-based and/or nickel-based alloys.

The end blocks 170a, 170b are biased towards one another such that the end blocks 170a, 170b impart a compression force $F_c$ to the forming body 60 in a direction parallel to a length L of the forming body 60. That is, the compression force $F_c$ is generally parallel to the +/−X direction of the coordinate axes depicted in FIG. 2. In embodiments, the compression force $F_c$ is applied to the end faces 66a, 66b at or below the centroid of mass of the forming body 60 such that the compression force $F_c$ acts directly on or adjacent to the root 70 of the forming body 60.

In the embodiments described herein, the compression force $F_c$ is generally perpendicular to the restraining force component $F_r$ of the holding force $F_h$ shown and described hereinabove with respect to FIGS. 3-6. In embodiments, the compression force $F_c$ may be applied to the end faces 66a, 66b using rams, such as rams similar to the rams 352, 354 schematically depicted and described hereinabove with respect to FIG. 3.

The compression force $F_c$ applied at the end faces 66a, 66b of the forming body 60 creates a bending moment $M_b$ in the upstream direction at the midpoint of the forming body 60 along the length L. This bending moment $M_b$, counteracts sag at the root 70 of the forming body 60, mitigating dimensional variations in the glass ribbon 12 formed with the forming body 60.

In the embodiments described herein, it has been found that the application of the compression force $F_c$ directly to the end faces 66a, 66b of the forming body 60 in conjunction with the separate application of the holding force $F_h$ directly to the forming surfaces 62, 64 of the forming body 60 with the cradle assemblies described herein decreases the amount of compression force required to counteract sag in the forming body relative to conventional techniques for restraining forming bodies. This has the effect of reducing stresses on the forming body 60 which, in turn, reduces the risk of fracture and increases the static fatigue life of the forming body 60.

Figure 7:
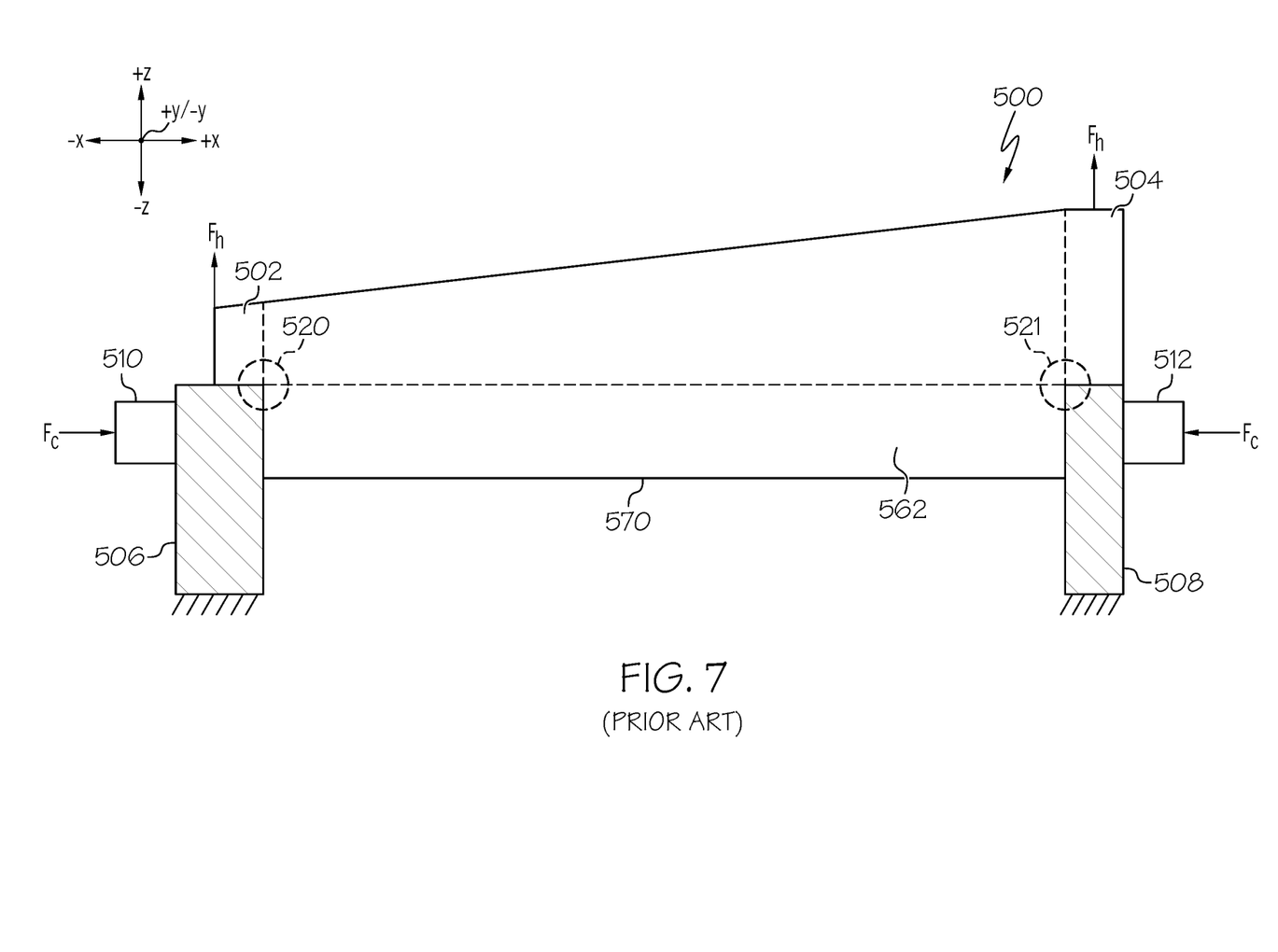
FIG. 7 schematically depicts a forming body conventionally supported at both ends with pier blocks.

More specifically, FIG. 7 schematically depicts a conventional technique for supporting a forming body 500 of a glass forming apparatus. In the conventional technique, the forming body 500 is formed with flanges 502, 504 at either end of the forming body 500. The flanges 502 are statically supported on pier blocks 506, 508 which abut against the end faces of the forming body 500. The root 570 and forming surfaces (one forming surface 562 is depicted in FIG. 7) of the forming body 500 extend between the pier blocks 506, 508. However, the pier blocks 506, 508 do not contact the root 570 or the forming surfaces 562. Instead, the holding force $F_h$ for restraining the forming body in the upstream direction is applied against the flanges 502, 504 outward from the root 570 and the forming surfaces 562. In this conventional technique, the compression force $F_c$ is applied against the pier blocks 506, 508 with compression blocks 510, 512 rather than directly against the end faces of the forming body. However, it has been found that the use of the pier blocks 506, 508 and compression blocks 510, 512 introduce significant stresses in the forming body 500 proximate the flanges, particularly in the areas 520, 521, which stresses may lead to cracking or even failure of the forming body 500. Example 1, presented below, provides modeling data showing the reduction in stress on the forming body using the cradle assemblies as described herein relative to the conventional technique for supporting a forming body depicted in FIG. 7. In addition, in the conventional technique for mitigating sag shown in FIG. 7, the holding force $F_h$ and the compression force $F_c$ are applied to the forming body in a coupled structure where the compression blocks 510,512 act on the forming body 500 through the pier blocks 506, 508. It has been determined that this arrangement requires a greater applied compression force to achieve the same amount of sag mitigation compared to the embodiments which utilize cradle blocks. Example 2, presented below, provides modeling data showing the improvement in sag reduction using the cradle assemblies as described herein relative to the conventional technique for supporting a forming body depicted in FIG. 7.

Moreover, because the holding force $F_h$ is applied directly to the forming surfaces 62, 64 of the forming body 60 and away from the end faces 66a, 66b of the forming body 60, there is greater flexibility in the location of application of the compression force $F_c$ to the end faces 66a, 66b of the forming body 60. That is, the location of the application of the compression force $F_c$ on the end faces 66a, 66b can be tuned to impart the maximum bending moment at the root 70, thereby maximizing the mitigation of sag in the forming body 60. While not wishing to be bound by theory, it is believed that the greater flexibility in the location of the application of the compression force $F_c$ against the end faces 66a, 66b of the forming body allows the compression force $F_c$ to be more accurately applied relative to the center of mass of the forming body which, in turn, allows for a reduction in the magnitude of the compression force $F_c$ while also maximizing the bending moment. More specifically, in the conventional technique for mitigating sag shown in FIG. 7, the holding force $F_h$ and the compression force $F_c$ are applied to the forming body in a coupled structure where the compression blocks 510,512 act on the forming body 500 through the pier blocks 506, 508, effectively spreading the application of the compression force over a large area of the end faces. However, in the embodiments described herein, the compression force is directly applied to the end face and the location of application can be adjusted relative to the center of mass of the forming body in the vertical direction, allowing for a maximum bending moment to be achieved for sag mitigation with a minimum compression force which, in turn, reduces the stress in the forming body.

Further, because the holding force $F_h$ is applied directly to the forming surfaces 62, 64 of the forming body 60 and away from the end faces 66a, 66b of the forming body 60, flanges (FIG. 7) proximate the end of the forming body can be eliminated, increasing the area of the forming surfaces and allowing the formation of glass ribbon with a greater width dimension.

Further, in the embodiments described herein, the dam area D refers to the portion of the length L of the forming body which is usable for the formation of the glass ribbon 12. In the embodiments described herein, the cradle assemblies 120a, 120b attached to the forming surfaces 62, 64 of the forming body 60 may also be used as a substitute for the dams which prevent molten glass from flowing off the end faces 66a, 66b of the forming body 60 rather than having separate dams further offset from the end faces 66a, 66b of the forming body 60 inside of the cradle assemblies 120a, 120b. Accordingly, it should be understood that, in some embodiments, the dam area D of the forming body 60 with the cradle assemblies 120a, 120b extends between the first cradle assembly 120a and the second cradle assembly 120b and contacts the first cradle assembly 120a and the second cradle assembly 120b.

Figure 8:
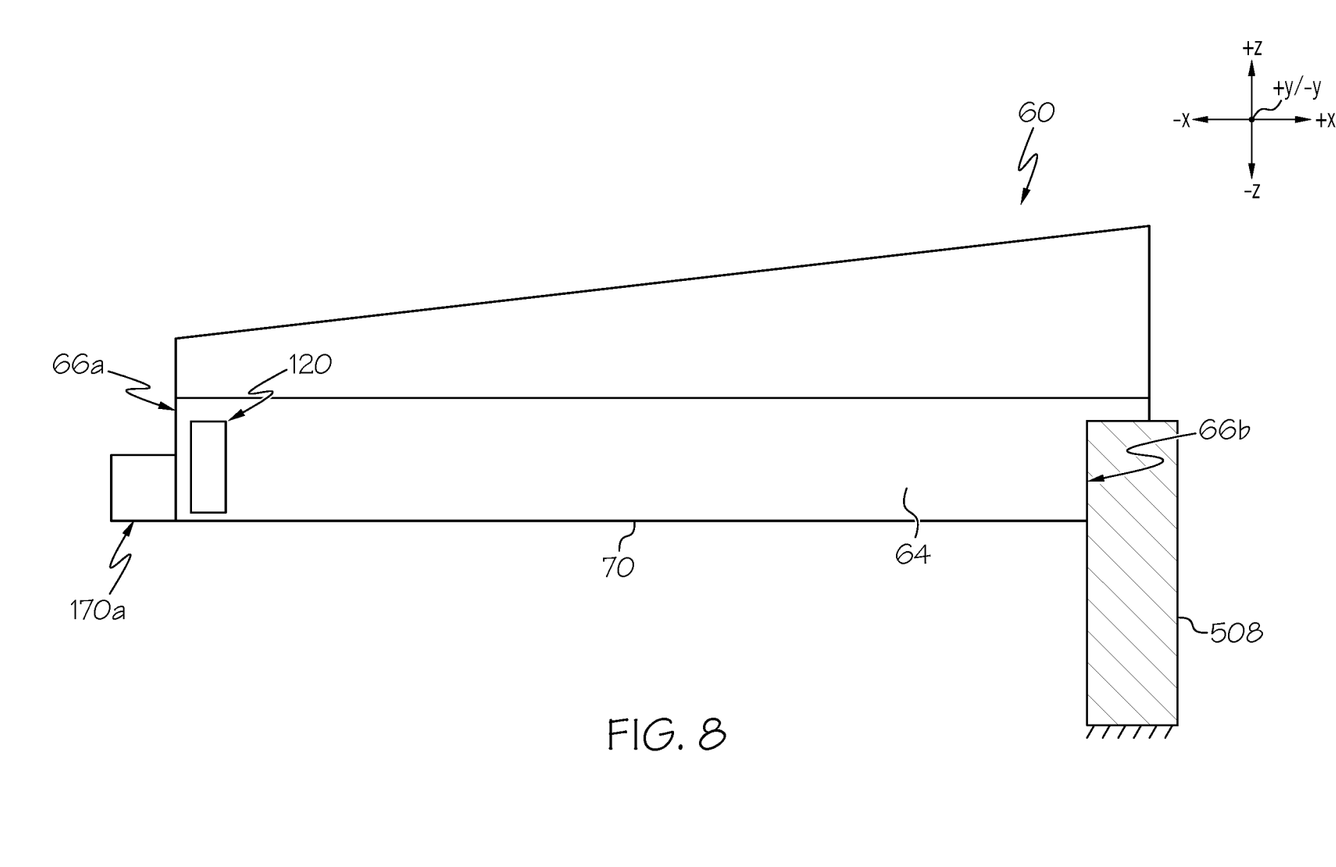
FIG. 8 schematically depicts a forming body supported at one end with a cradle assembly and at the opposite end with a pier block.

While FIGS. 1 and 2 generally depict the use of a pair of cradle assemblies 120a, 120b supporting the forming body 60, it is believe that a single cradle assembly can be used while still obtaining a reduction in the stresses in the forming body which, in turn, reduces the risk of fracture and increases the static fatigue life of the forming body 60. Referring to FIG. 8 by way of example, in one embodiment, a single cradle assembly 120a may be utilized to apply the holding force to the forming surfaces (forming surface 64 shown in FIG. 8) at one end of the forming body 60 and a single end block 170a may be used to apply the compression force $F_c$ to the end face 66a of the forming body 60 adjacent to the single cradle assembly 120a. In this embodiment, the opposite end of the forming body 60 may be supported with a pier block 508 such that the pier block 508 is fixed against the end face 66b. The compression force may be applied to the root 70 of the forming body 60 by biasing the end block 170a directly against the end face 66a in a direction towards the pier block 508 which fixes the other end face 66b. While this embodiment includes the use of a pier block 508 at one end of the forming body 60, it is believed that the application of the holding force $F_h$ directly to the forming surfaces with the single cradle assembly 120a combined with the application of the compression force $F_c$ directly to the end face 66a of the forming body 60 (rather than through a pier block) will result in a reduction of stress in the forming body as well as an increase in the usable forming area of the forming body relative to the conventional technique for supporting a forming body depicted in FIG. 7. Moreover, the embodiment schematically depicted in FIG. 8 may be used to better orient the forming body 60. For example, the interface between the pier block 508 and the forming body 60 may act as a datum to orient the forming body with respect to the vertical and horizontal planes of the coordinate axes depicted in FIG. 8.

EXAMPLES

The embodiments described herein will be further clarified by the following examples.

Example 1

Mathematical models were developed for a forming body under three separate support conditions: (1) a forming body conventionally supported with pier blocks at either end, as depicted in FIG. 7, with an applied compression force of 9000 lbs. (4082.3 kg-F); (2) a forming body supported with cradle assemblies (two cradle block configuration) contacting the forming surfaces of the forming body at either end of the forming body and end blocks applying a compression force of 9000 lbs. (4082.3 kg-F) to the end faces of the forming body, as depicted in FIG. 2; and (3) a forming body supported with cradle assemblies (two cradle block configuration) contacting the forming surfaces of the forming body at either end of the forming body and end blocks applying a compression force of 8000 lbs. (3628.7 kg-F) to the end faces of the forming body, as depicted in FIG. 2. The modeled forming bodies were based on a zircon forming body to which molten glass is delivered at a rate of approximately 2000 lbs/hr (900 kg/hr) at a temperature of approximately 1300° C. The inlet stress at the end face of the forming body was calculated as function of time (days). The deformation (i.e., sag) of the forming body along its length was also determined over a modeled time period of 1 year.

Figure 9:
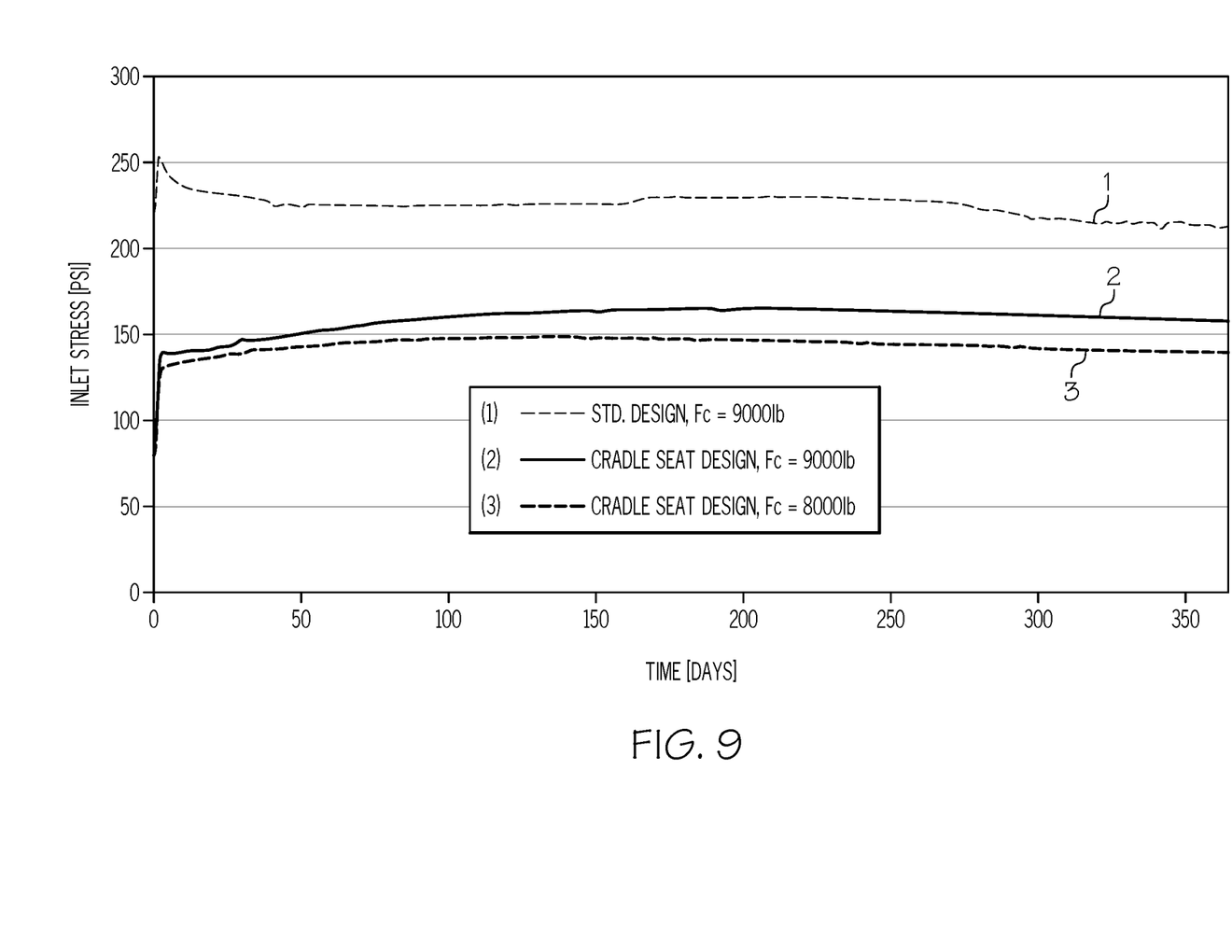
FIG. 9 graphically depicts the modeled stress in the forming body as a function of time for three forming bodies under different support conditions.

FIG. 9 graphically depicts the stress at the inlet end of the forming body for the three modeled forming bodies under the support conditions specified above. As shown in FIG. 9, the forming bodies supported with cradle assemblies as depicted in FIG. 2 had significantly lower stress than the forming body supported with pier blocks as depicted in FIG. 7. Indeed, curve (2) shows that, under identical loading conditions, the stress in the forming body may be reduced by more than 50 PSI through the use of cradle assemblies rather than pier blocks. The lower stress may extend the service life of the forming body by mitigating static fatigue. In addition, the data in FIG. 9 generally indicate that the same sag rate can be achieved with lower compression force through the use of cradle assemblies rather than pier blocks. The lower applied compression force further reduces the stress in the forming body which, in turn, mitigates static fatigue.

Figure 10:
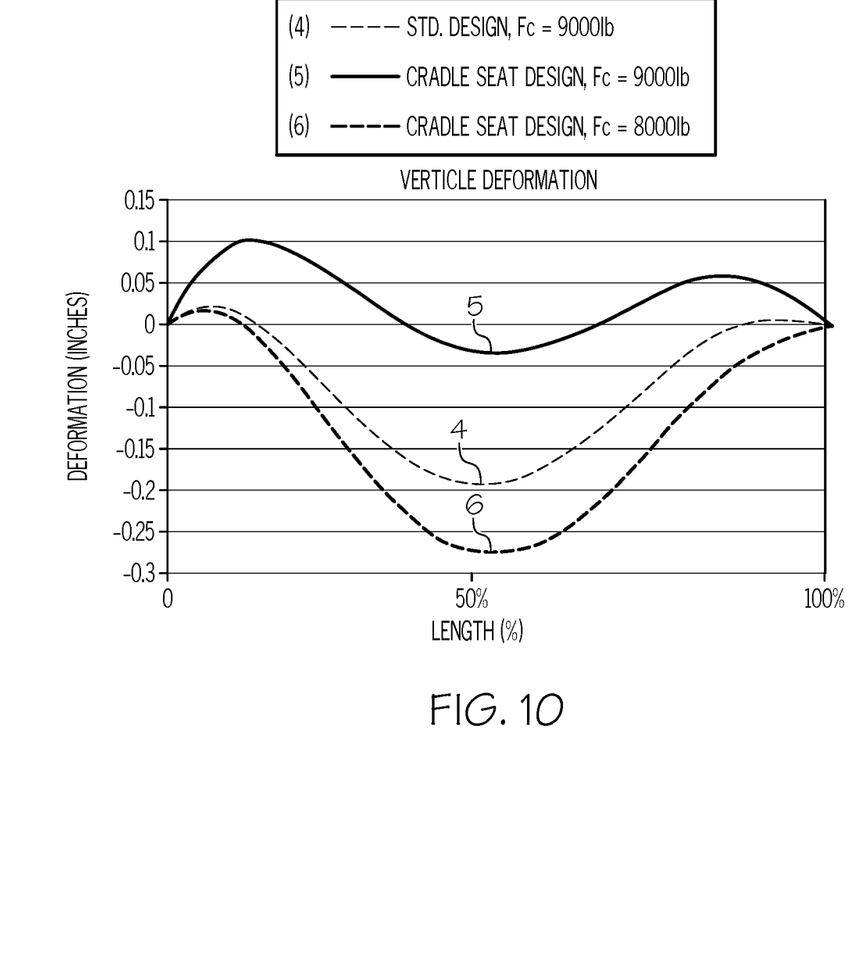
FIG. 10 graphically depicts the modeled deformation in the forming body as a function of position along the length of the forming body for three forming bodies under different support conditions.

FIG. 10 graphically depicts the deformation or sag in the forming body as a function of position along the length of the forming body for the three modeled forming bodies with the support conditions described above. Curve (5) shows that the forming body supported by the cradle assemblies described herein had significantly lower sag, particularly proximate the center of the forming body, than the forming body supported by pier blocks (represented by curve (4)) under the same compression force loading conditions (9000 lbs.). Curve (6) shows that the forming body supported by cradle assemblies with a lower applied compression force (8000 lbs.) may have slightly more sag than the forming body supported by pier blocks. However, reading this data in conjunction with the data in FIG. 9, the increase in sag is accompanied by a decrease in the stress in the forming body which may extend the service life of the forming body by mitigating static fatigue. Based on this data, it is believed that there is a magnitude of applied compression force which will both mitigate sag and decrease the stress in the forming body thereby extending the service life of the forming body. For instance, in this example, it is believed that there is a magnitude of applied compression force between 8000 lbs. and 9000 lbs. that would mitigate sag and reduce the stress in the forming body.

Based on the foregoing, it should now be understood that the cradle assemblies described herein can be used to support a forming body of a glass forming apparatus to reduce sag in the forming body. The use of the cradle assemblies coupled to the forming surfaces of the forming body decouples the holding force $F_h$ and, more specifically, the restraining force component $F_r$ of the holding force $F_h$, from the compression force $F_c$, thereby reducing the amount of stress in the forming body while still counteracting sag. The reduction of the stress in the forming body reduces the risk of static fatigue, mitigating the risk of failure and extending the service life of the forming body.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass forming apparatus comprising:
a forming body comprising a first forming surface and a second forming surface, the first forming surface and the second forming surface converging at a root;
at least one cradle assembly comprising a first contact surface and a second contact surface oriented in a V-configuration with respect to one another, wherein:
the first contact surface is engaged with the first forming surface of the forming body;
the second contact surface is engaged with the second forming surface of the forming body, the first contact surface and the second contact surface imparting a holding force to the forming body, the holding force having an upward vertical component preventing movement of the forming body in a downward vertical direction; and
the root extends through and is positioned below the at least one cradle assembly; and
at least one end block engaged with an end face of the forming body, the at least one end block imparting a compression force to the forming body in a direction parallel to a length direction of the forming body and perpendicular to the restraining force component.

2. The glass forming apparatus of claim 1, wherein:
the first contact surface is positioned on a first cradle block; and
the second contact surface is positioned on a second cradle block independent of the first cradle block.

3. The glass forming apparatus of claim 2, wherein the first cradle block and the second cradle block are biased towards one another thereby impinging the forming body therebetween.

4. The glass forming apparatus of claim 1, wherein the compression force is imparted to the end face of the forming body below a centroid of mass of the forming body.

5. The glass forming apparatus of claim 1, wherein:
the at least one cradle assembly comprises a first cradle assembly and a second cradle assembly;
the first cradle assembly is engaged with the forming body at a first end of the forming body; and
the second cradle assembly is engaged with the forming body at a second end of the forming body.

6. The glass forming apparatus of claim 5, wherein:
the at least one end block comprises a first end block and a second end block;
the first end block is engaged with a first end face of the forming body;
the second end block is engaged with a second end face of the forming body; and
the first end block and the second end block are biased towards one another thereby imparting the compression force to the forming body in the length direction of the forming body.

7. The glass forming apparatus of claim 5, wherein a dam area of the forming body extends from the first cradle assembly to the second cradle assembly, the dam area contacting the first cradle assembly and the second cradle assembly.

8. The glass forming apparatus of claim 1, wherein:
the at least one cradle assembly is engaged with the forming body at a first end of the forming body; and
a second end of the forming body is supported on a pier block.

9. The glass forming apparatus of claim 8, wherein:
the at least one end block is engaged with a first end face of the forming body;
the pier block is engaged with a second end face of the forming body; and
the at least one end block is biased towards the pier block thereby imparting the compression force to the forming body in the length direction of the forming body.

10. A method for supporting a forming body comprising a first forming surface and a second forming surface converging at a root, the method comprising:
applying a holding force to the first forming surface and the second forming surface by engaging a first contact surface of a cradle assembly with the first forming surface of the forming body and engaging a second contact surface of the cradle assembly with the second forming surface of the forming body, wherein the first contact surface and the second contact surface are oriented in a V-configuration with respect to one another, the root extends through and is positioned below the cradle assembly and the holding force has an upward vertical force component preventing movement of the forming body in a downward vertical direction; and
applying a compression force to an end face of the forming body in a direction parallel to a length of the forming body, the compression force imparting a counter moment thereby mitigating sag along the length of the forming body.

11. The method for supporting a forming body of claim 10, wherein: the cradle assembly comprises a first cradle block and a second cradle block independent of the first cradle block; the first contact surface is positioned on the first cradle block; and the second contact surface is positioned on the second cradle block.

12. The method for supporting a forming body of claim 11, wherein engaging a first contact surface with the first forming surface and engaging the second contact surface with the second forming surface comprises biasing the first cradle block and the second cradle block towards one another.

13. The method for supporting a forming body of claim 10, wherein applying the compression force comprises engaging at least one end block with an end face of the forming body.

14. The method for supporting a forming body of claim 10, wherein the compression force is applied below a centroid of mass of the forming body.

15. A glass forming apparatus comprising:
a forming body comprising a first forming surface and a second forming surface, the first forming surface and the second forming surface converging at a root;
at least one cradle assembly comprising a first contact surface and a second contact surface oriented in a V-configuration with respect to one another, wherein:

the first contact surface is positioned on a first cradle block and the first contact surface is engaged with the first forming surface of the forming body;

the second contact surface is positioned on a second cradle block independent of the first cradle block and the second contact surface is engaged with the second forming surface of the forming body; and the first cradle block is biased towards the second cradle block thereby impinging the forming body therebetween, the first contact surface and the second contact surface imparting a holding force to the forming body, the holding force having an upward vertical component preventing movement of the forming body in a downward vertical direction; and at least one end block engaged with an end face of the forming body, the at least one end block imparting a compression force to the forming body in a direction parallel to a length direction of the forming body and perpendicular to the restraining force component.

16. The glass forming apparatus of claim 15 further comprising a first ram engaged with the first cradle block, wherein the first ram biases the first cradle block towards the second cradle block.

17. The glass forming apparatus of claim 16 further comprising a second ram engaged with the second cradle block, wherein the second ram biases the second cradle block towards the first cradle block.

18. The glass forming apparatus of claim 15, wherein the compression force is imparted to the end face of the forming body below a centroid of mass of the forming body.

19. The glass forming apparatus of claim 15, wherein:
the at least one cradle assembly comprises a first cradle assembly and a second cradle assembly;
the first cradle assembly is engaged with the forming body at a first end of the forming body; and
the second cradle assembly is engaged with the forming body at a second end of the forming body.

20. The glass forming apparatus of claim 19, wherein:
the at least one end block comprises a first end block and a second end block;
the first end block is engaged with a first end face of the forming body;
the second end block is engaged with a second end face of the forming body; and
the first end block and the second end block are biased towards one another thereby imparting the compression force to the forming body in the length direction of the forming body.

* * * * *